United States Patent
Ganlath et al.

(10) Patent No.: US 11,312,300 B1
(45) Date of Patent: Apr. 26, 2022

(54) OBJECT NOTIFICATION SYSTEMS FOR IDENTIFYING AND NOTIFYING VEHICLES OF RELEVANT OBJECTS

(71) Applicant: Toyota Motor Engineering & Manufacturing North America, Inc., Plano, TX (US)

(72) Inventors: Akila C. Ganlath, Agua Dulce, CA (US); Nejib Ammar, San Jose, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/161,744

(22) Filed: Jan. 29, 2021

(51) Int. Cl.
| | |
|---|---|
| *G08G 1/00* | (2006.01) |
| *B60Q 9/00* | (2006.01) |
| *G06K 9/00* | (2022.01) |
| *B60K 35/00* | (2006.01) |

(52) U.S. Cl.
CPC .......... *B60Q 9/00* (2013.01); *B60K 35/00* (2013.01); *G06K 9/00791* (2013.01); *G06K 9/00832* (2013.01); *B60K 2370/152* (2019.05)

(58) Field of Classification Search
CPC .. B60Q 9/00; G06K 9/00791; G06K 9/00832; B60K 35/00; B60K 2370/152
See application file for complete search history.

(56) References Cited

U.S. PATENT DOCUMENTS

| | | | |
|---|---|---|---|
| 2015/0294160 A1* | 10/2015 | Takahashi | H04N 13/204 382/104 |
| 2016/0039285 A1 | 2/2016 | Mathieu et al. | |
| 2019/0205675 A1* | 7/2019 | McGill | B60W 30/0953 |
| 2019/0359133 A1 | 11/2019 | Lee et al. | |
| 2020/0189614 A1* | 6/2020 | Ito | G06K 9/00805 |
| 2021/0004589 A1* | 1/2021 | Turkelson | G06K 9/6273 |
| 2021/0063162 A1* | 3/2021 | Moskowitz | G05D 1/0088 |
| 2021/0183093 A1* | 6/2021 | Park | G06K 9/00805 |

FOREIGN PATENT DOCUMENTS

| | | |
|---|---|---|
| JP | 2004356731 A | 12/2004 |
| JP | 2007315896 A | 12/2007 |
| JP | 2016071666 A | 5/2016 |
| WO | 2020040145 A1 | 2/2020 |

OTHER PUBLICATIONS

Scenic beauty & road safety: Bluetooth alerts to help rental car drivers (https://bizedge.co.nz/story/scenic-beauty-road-safety-bluetooth-alerts-help-rental-car-drivers), published Jul. 4, 2016, 9 pages.

* cited by examiner

*Primary Examiner* — Toan N Pham
(74) *Attorney, Agent, or Firm* — Dinsmore & Shohl LLP

(57) ABSTRACT

A method includes capturing object data using a data capture device of a vehicle, determining that the captured object data includes a relevant object based on a user profile associated with an occupant of the vehicle, and executing a notification at the vehicle indicating a presence of the relevant object in response to determining that the captured object data includes the relevant object.

20 Claims, 6 Drawing Sheets

OBJECT NOTIFICATION SYSTEMS FOR IDENTIFYING AND NOTIFYING VEHICLES OF RELEVANT OBJECTS

TECHNICAL FIELD

The present specification generally relates to vehicle notification systems for identifying objects in relation to a vehicle and providing a notification to the vehicle and, more specifically, notifying the vehicle of objects that are relevant to a particular occupant of the vehicle.

BACKGROUND

Drivers on long trips are unable to adequately enjoy the scenic beauty of their driving route in the same way as passengers due to the focus they must have on the driving tasks. However, automated driving technologies enable a driver to pay less attention to the low-level tasks of driving, thereby freeing the driver to enjoy more of the scenery. In addition, advances in vehicle sensing and perception allow vehicles to perceive and understand their surroundings as well as the state of the vehicle occupants. Thus, vehicle alert devices are capable of providing alerts, such as collision alert, lane-departure warning, phone notifications, and the like, to an occupant of the vehicle. However, these alerts are not personalized for a particular occupant and are restricted to safety events, not scenery.

Accordingly, a need exists for improved vehicle notification systems and methods that identify an object that is of particular relevance to an occupant of the vehicle and notify the occupant of the presence of the relevant object.

SUMMARY

In one embodiment, a method includes capturing object data using a data capture device of a vehicle, determining that the captured object data includes a relevant object based on a user profile associated with an occupant of the vehicle, and executing a notification at the vehicle indicating a presence of the relevant object in response to determining that the captured object data includes the relevant object.

In another embodiment, a method includes selecting a user profile of an occupant in a first vehicle, the user profile including a list of relevant objects, determining a route of the first vehicle, detecting a relevant object from the list of relevant objects along the route of the first vehicle using a data capture device of a second vehicle, and executing a notification at the first vehicle indicating that the first vehicle is approaching the relevant object.

In yet another embodiment, an object notification system includes a controller configured to capture object data using a data capture device of a vehicle, determine whether the captured object data includes a relevant object based on a user profile associated with an occupant of the vehicle, and execute a notification at the vehicle indicating a presence of the relevant object in response to determining that the captured object data includes the relevant object.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
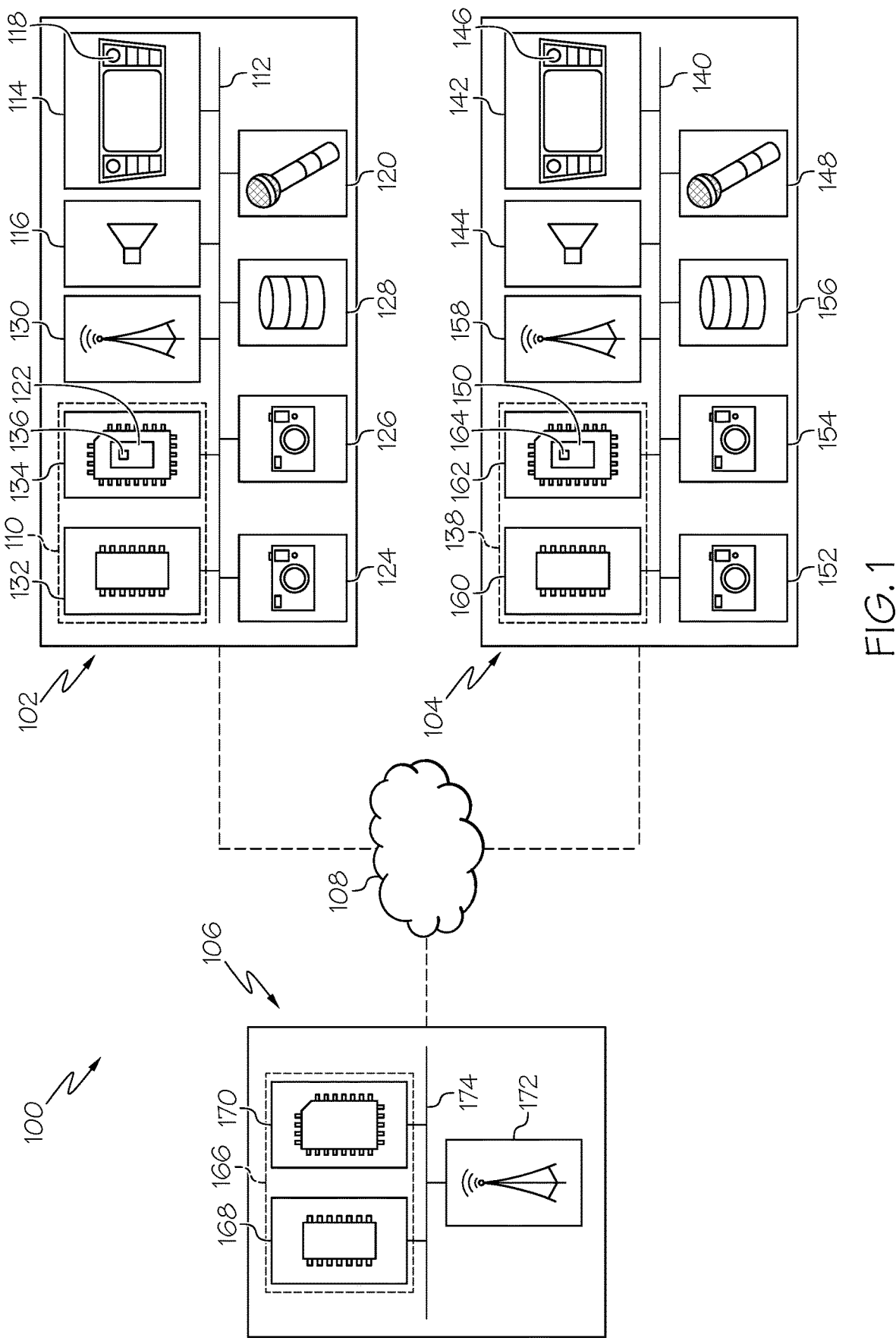
FIG. 1 schematically depicts components of an object notification system, according to one or more embodiments shown and described herein.

Embodiments described herein are directed to object notification systems and methods for identifying an object that is relevant to a particular occupant of a vehicle and notifying the occupant of the presence of the relevant object.

The methods for identifying a relevant object and providing a notification to an occupant of a vehicle include capturing object data using a data capture device of a vehicle, determining that the captured object data includes a relevant object based on a user profile associated with an occupant of the vehicle, and executing a notification at the vehicle indicating a presence of the relevant object in response to determining that the captured object data includes the relevant object. In embodiments, a primary vehicle may identify a relevant object utilizing one or more exterior sensors as the primary vehicle passes the relevant object. Thus, the notification is executed at the primary vehicle as the primary vehicle passes the relevant object. In embodiments, the primary vehicle may be notified of the presence of the relevant object in advance based on a known location of the relevant object along a route being traveled by the primary vehicle. The known location of the relevant object may be previously collected and provided on a map or obtained by a secondary vehicle.

Various embodiments of the systems and methods and the operation of the systems are described in more detail herein. Whenever possible, the same reference numerals will be used throughout the drawings to refer to the same or like parts.

Referring now to FIG. 1, a schematic diagram of an embodiment of an object notification system 100 is depicted including a primary vehicle system 102, a secondary vehicle system 104, a server 106, and a network 108, according to one or more embodiments shown and described herein. It is noted that, while the primary vehicle system 102 and the secondary vehicle system 104 are depicted in isolation, each of the primary vehicle system 102 and the secondary vehicle system 104 may be included within a vehicle, for example, within a primary vehicle and a secondary vehicle, respectively. Further, it should be appreciated that while only one secondary vehicle system 104 is illustrated, the object notification system 100 may include any number of secondary vehicle systems 104 based on the number of secondary vehicles present. Additionally, it should be appreciated that the object notification system 100 may operate in situations where a secondary vehicle is not present, as described in the example illustrated in FIGS. 3 and 4, as opposed to the example illustrated in FIGS. 5 and 6, which includes a secondary vehicle.

In embodiments, the primary vehicle system 102 includes a controller 110, a communication path 112, a display device 114, a speaker 116, tactile operating device 118, a microphone 120, a virtual assistance module 122, one or more data capture devices or exterior sensors 124, one or more interior sensors 126, a data storage component 128, and network interface hardware 130. The various components of the primary vehicle system 102 and the interaction thereof will be described in detail below. However, it should be noted that, in embodiments, the primary vehicle system 102 may not include each of the various components discussed herein.

As noted above, the primary vehicle system 102 includes the communication path 112. The communication path 112 may be formed from any medium that is capable of transmitting a signal such as, for example, conductive wires, conductive traces, optical waveguides, or the like. Moreover, the communication path 112 may be formed from a combination of mediums capable of transmitting signals. In one embodiment, the communication path 112 includes a combination of conductive traces, conductive wires, connectors, and buses that cooperate to permit the transmission of electrical data signals to components such as processors, memories, sensors, input devices, output devices, and communication devices. Accordingly, the communication path 112 may include a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 112 communicatively couples the various components of the primary vehicle system 102. As used herein, the term "communicatively coupled" means that coupled components are capable of exchanging data signals with one another such as, for example, electrical signals via conductive medium, electromagnetic signals via air, optical signals via optical waveguides, and the like.

As noted above, the primary vehicle system 102 includes the controller 110 including the one or more processors 132 and one or more memory modules 134. Each of the one or more processors 132 may be any device capable of executing machine readable instructions. Accordingly, each of the one or more processors 132 may be an integrated circuit, a microchip, a computer, or any other computing device. The one or more processors 132 are communicatively coupled to the other components of the primary vehicle system 102 by the communication path 112. Accordingly, the communication path 112 may communicatively couple any number of processors with one another, and allow the modules coupled to the communication path 112 to operate in a distributed computing environment. Specifically, each of the modules may operate as a node that may send and/or receive data.

Each of the one or more memory modules 134 of the primary vehicle system 102 is coupled to the communication path 112 and communicatively coupled to the one or more processors 132. The one or more memory modules 134 may include RAM, ROM, flash memories, hard drives, or any device capable of storing machine readable instructions such that the machine readable instructions may be accessed and executed by the one or more processors 132. The machine readable instructions may include logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 134. In some embodiments, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In embodiments, the one or more memory modules 134 include the virtual assistance module 122 that processes speech input signals received from the microphone 120 and/or extracts speech information from such signals, as will be described in further detail below. Furthermore, the one or more memory modules 134 include machine readable instructions that, when executed by the one or more processors 132, cause the primary vehicle system 102 to perform the actions described below including the steps described in FIGS. 4 and 6. The virtual assistance module 122 includes voice input analysis logic 136.

The voice input analysis logic 136 may be stored in the one or more memory modules 134. In embodiments, the voice input analysis logic 136 may be stored on, accessed by, and/or executed on the one or more processors 132. In embodiments, the voice input analysis logic 136 may be executed on and/or distributed among other processing systems to which the one or more processors 132 are communicatively linked.

The voice input analysis logic 136 may be implemented as computer readable program code that, when executed by a processor, implements one or more of the various processes described herein. The voice input analysis logic 136 may be a component of one or more processors 132, or the voice input analysis logic 136 may be executed on and/or distributed among other processing systems to which one or more processors 132 is operatively connected. In one or more arrangements, the voice input analysis logic 136 may include artificial or computational intelligence elements, e.g., neural network, fuzzy logic, or other machine learning algorithms.

The voice input analysis logic 136 may receive one or more occupant voice inputs from one or more vehicle occupants of a primary vehicle. The one or more occupant voice inputs may include any audial data spoken, uttered, pronounced, exclaimed, vocalized, verbalized, voiced, emitted, articulated, and/or stated aloud by a vehicle occupant. The one or more occupant voice inputs may include one or more letters, one or more words, one or more phrases, one or more sentences, one or more numbers, one or more expressions, and/or one or more paragraphs, etc.

The one or more occupant voice inputs may be sent to, provided to, and/or otherwise made accessible to the voice input analysis logic 136. The voice input analysis logic 136 may be configured to analyze the occupant voice inputs. The voice input analysis logic 136 may analyze the occupant voice inputs in various ways. For example, the voice input analysis logic 136 may analyze the occupant voice inputs using any known natural language processing system or technique. Natural language processing may include analyzing each user's notes for topics of discussion, deep semantic relationships and keywords. Natural language processing may also include semantics detection and analysis and any other analysis of data including textual data and unstructured data. Semantic analysis may include deep and/or shallow semantic analysis. Natural language processing may also include discourse analysis, machine translation, morphological segmentation, named entity recognition, natural language understanding, optical character recognition, part-of-speech tagging, parsing, relationship extraction, sentence breaking, sentiment analysis, speech recognition, speech segmentation, topic segmentation, word segmentation, stemming, and/or word sense disambiguation. Natural language processing may use stochastic, probabilistic, and statistical methods.

The voice input analysis logic 136 may analyze the occupant voice inputs to determine whether one or more commands, answers, and/or one or more inquiries are included in the occupant voice inputs. The voice input analysis logic 136 may analyze the vehicle operational data in real-time or at a later time. As used herein, the term "real time" means a level of processing responsiveness that a user or system senses as sufficiently immediate for a particular process or determination to be made, or that enables the processor to keep up with some external process.

Still referring to FIG. 1, the primary vehicle system 102 includes the display device 114 for providing visual output such as, for example, notifications, entertainment, maps, navigation, information, or a combination thereof. The display device 114 is coupled to the communication path 112 and communicatively coupled to the one or more processors 132. Accordingly, the communication path 112 communicatively couples the display device 114 to other modules of the primary vehicle system 102. The display device 114 may include any medium capable of transmitting an optical output such as, for example, a cathode ray tube, light emitting diodes, a liquid crystal display, a plasma display, projection display, holographic display, augmented display, or the like. Moreover, the display device 114 may be a touchscreen that, in addition to providing optical information, detects the presence and location of a tactile input upon a surface of or adjacent to the display. Accordingly, the display device 114 may receive mechanical input directly upon the optical output provided by the display device 114.

As noted above, the primary vehicle system 102 includes the speaker 116 for transforming data signals into mechanical vibrations, such as to output audible prompts or audible information. The speaker 116 is coupled to the communication path 112 and communicatively coupled to the one or more processors 132.

Still referring to FIG. 1, the primary vehicle system 102 includes a tactile operating device 118 coupled to the communication path 112 such that the communication path 112 communicatively couples the tactile operating device 118 to other modules of the primary vehicle system 102. The tactile operating device 118 may be any device capable of transforming mechanical, optical, or electrical signals into a data signal capable of being transmitted with the communication path 112. Specifically, the tactile operating device 118 may include any number of movable objects that each transform physical motion into a data signal that may be transmitted to over the communication path 112 such as, for example, a button, a switch, a knob, a microphone, or the like. In some embodiments, the display device 114 and the tactile operating device 118 are combined as a single module and operate as an audio head unit or an infotainment system.

As noted above, the primary vehicle system 102 includes the microphone 120 for transforming acoustic vibrations received by the microphone 120 into a speech input signal. The microphone 120 is coupled to the communication path 112 and communicatively coupled to the one or more processors 132. The one or more processors 132 may process the speech input signals received from the microphone 120 and/or extract speech information from such signals.

As noted above, the primary vehicle system 102 includes the one or more exterior sensors 124. The exterior sensors 124 may be mounted onto a primary vehicle including the primary vehicle system 102 and directed away from primary vehicle such that the exterior sensors 124 may capture object data of an object a distance away from the primary vehicle. In embodiments, a plurality of exterior sensors 124 may be mounted or otherwise fixed to various locations of the primary vehicle. The one or more exterior sensors 124 may be any device having an array of sensing devices capable of detecting radiation in an ultraviolet wavelength band, a visible light wavelength band, or an infrared wavelength band. The one or more exterior sensors 124 may have any resolution. In some embodiments, one or more optical components, such as a mirror, fish-eye lens, or any other type of lens may be optically coupled to the one or more exterior sensors 124. In embodiments described herein, the one or more exterior sensors 124 may provide object data to the one or more processors 132 or another component communicatively coupled to the communication path 112.

In some embodiments, the one or more exterior sensors 124 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein. Ranging sensors like radar may be used to obtain a rough depth and speed information of an object. The primary vehicle system 102 may capture object data of an object using one or more imaging sensors. The one or more processors 132 may process the captured object data, including at least one of image data and sound data, with the neural network to identify the object, which can then be used to determine whether the identified object appears on a list of relevant objects associated with a selected user profile, as described in more detail herein.

In operation, the one or more exterior sensors 124 capture object data and communicate the object data to the one or more processors 132 and/or to other systems communicatively coupled to the communication path 112. The object data may be received by the one or more processors 132, which may process the object data using one or more processing algorithms. Any known or yet-to-be developed video, image, and audio processing algorithms may be applied to the object data in order to identify the object. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the object data to extract objects. Example object recognition algorithms include, but are not limited to, scale-invariant feature transform ("SIFT"), speeded up robust features ("SURF"), and edge-detection algorithms. As described herein, in embodiments, the captured object data may be transmitted to the server 106 such that the processing of the image data may be performed at the server 106, thereby reducing the processing demands of the primary vehicle system 102. In some embodiments, the processing of the image data may be performed at the primary vehicle system 102, and the primary vehicle system 102 may selectively transmit the captured object data to the server 106 based on analysis of the processed image data.

As noted above, the primary vehicle system 102 includes the one or more interior sensors 126 provided within an interior of the primary vehicle. It should be appreciated that the one or more interior sensors 126 may include the same components and capabilities as the exterior sensors 124. However, the one or more interior sensors 126 are provided within an interior of the primary vehicle and directed within an occupant compartment of the primary vehicle to detect a direction of a gaze of an occupant of the primary vehicle. Accordingly, the interior sensors 126 are configured to capture data of a gaze of one or more occupants of the primary vehicle. The data is then communicated to the one or more processors 132 to determine a direction of the gaze of the one or more occupants. In response to an object being identified by the one or more exterior sensors 124, the one or more processors 132 determine whether the one or more occupants are gazing in a direction of the object.

As noted above, the primary vehicle system 102 includes a data storage component 128. The data storage component 128 may store data that may be utilized by the memory modules 134 and/or other components of the primary vehicle system 102. For example, the data storage component 128 may store user profiles associated with one or more users. A user profile associated with a user may include a list of relevant objects for which an occupant associated with the user profile is to be notified about when the primary vehicle is within a predetermine range or will be within a predetermined range of the relevant object, as described in more detail herein.

As noted above, the primary vehicle system 102 includes the network interface hardware 130 for communicatively coupling the primary vehicle system 102 with the server 106 via the network 108. The network interface hardware 130 is coupled to the communication path 112 such that the communication path 112 communicatively couples the network interface hardware 130 to other modules of the primary vehicle system 102. The network interface hardware 130 may be any device capable of transmitting and/or receiving data via a wireless network. Accordingly, the network interface hardware 130 may include a communication transceiver for sending and/or receiving data according to any wireless communication standard. For example, the network interface hardware 130 may include a chipset (e.g., antenna, processors, machine readable instructions, etc.) to communicate over wireless computer networks such as, for example, wireless fidelity (Wi-Fi), WiMax, Bluetooth®, IrDA, Wireless USB, Z-Wave, ZigBee, or the like. In some embodiments, the network interface hardware 130 includes a Bluetooth® transceiver that enables the primary vehicle system 102 to exchange information with a mobile device such as, for example, a smartphone, via Bluetooth® communication.

The network 108 generally includes a plurality of base stations that are configured to receive and transmit data according to mobile telecommunication standards. The base stations are further configured to receive and transmit data over wired systems such as public switched telephone network (PSTN) and backhaul networks. The network 108 may further include any network accessible via the backhaul networks such as, for example, wide area networks, metropolitan area networks, the Internet, satellite networks, or the like. Thus, the base stations generally include one or more antennas, transceivers, and processors that execute machine readable instructions to exchange data over various wired and/or wireless networks. Accordingly, the network 108 may be utilized as a wireless access point by the network interface hardware 130 to access the server 106.

Still referring to FIG. 1, the secondary vehicle system 104 includes a controller 138, a communication path 140, a display device 142, a speaker 144, tactile input hardware 146, a microphone 148, a virtual assistance module 150, one or more exterior sensors 152, one or more interior sensors 154, a data storage component 156, and network interface hardware 158. The controller 138 includes one or more processors 160 and one or more memory modules 162. The virtual assistance module 150, which may be stored on the one or more memory modules 162, includes voice input analysis logic 164. The components of the secondary vehicle system 104 may be structurally similar to and have similar functions as the corresponding components of the primary vehicle system 102 (e.g., the controller 138 corresponds to the controller 110, the communication path 140 corresponds to the communication path 112, the display device 142 corresponds to the display device 114, the speaker 144 corresponds to the speaker 116, the tactile input hardware 146 corresponds to the tactile operating device 118, the microphone 148 corresponds to the microphone 120, the virtual assistance module 150 corresponds to the virtual assistance module 122, the one or more exterior sensors 152 corresponds to the one or more exterior sensors 124, the one or more interior sensors 154 corresponds to the one or more interior sensors 126, the data storage component 156 corresponds to the data storage component 128, and the network interface hardware 158 corresponds to the network interface hardware 130). However, it should be noted that, in embodiments, the secondary vehicle system 104 may not include each of the various components discussed herein.

Still referring to FIG. 1, the server 106 includes a controller 166 including one or more processors 168 and one or more memory modules 170, network interface hardware 172, and a communication path 174. The one or more processors 168 may be an integrated circuit, a microchip, a computer, or any other computing device. The one or more memory modules 170 may include RAM, ROM, flash memories, hard drives, or any device capable of storing machine readable and executable instructions such that the machine readable and executable instructions can be accessed by the one or more processors 168. The communication path 174 may be similar to the communication path 112 in some embodiments. It should be appreciated that one or more of the processes discussed above with respect to the primary vehicle system 102 and the secondary vehicle system 104 may be at least partially executed at the server 106 to reduce the processing power at the primary vehicle system 102 and the secondary vehicle system 104 and/or reduce the processing time to carry out the one or more processes. For example, the server 106 may identify a list of objects determined to be relevant based on the selected user profile identified by the primary vehicle system 102 and the secondary vehicle system 104. The server 106 may also analyze the object data captured by the primary vehicle system 102 or the secondary vehicle system 104 to determine whether the object data includes a relevant object based on the selected user profile.

Figure 2:
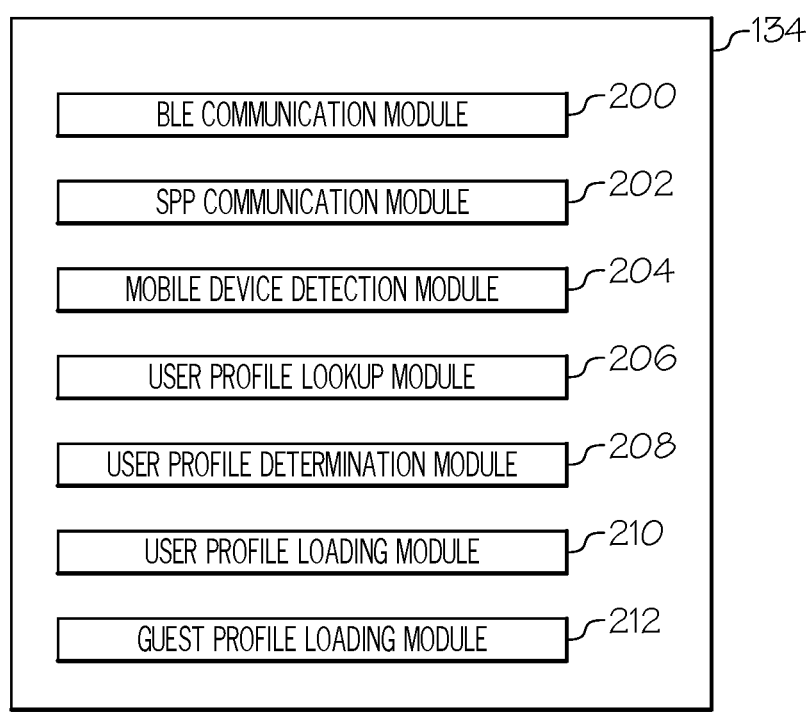
FIG. 2 schematically depicts a diagram of a memory module of the object notification system of FIG. 1, according to one or more embodiments shown and described herein.

Now referring to FIG. 2, an exemplary memory module 134 of the primary vehicle system 102 is shown. It should be noted that the memory module 162 of the secondary vehicle system 104 may include the same components of the memory modules 134 described herein as well. In embodiments, the one or more memory modules 134 include a BLE communication module 200, an SPP communication module 202, a mobile device detection module 204, a user profile lookup module 206, a user profile determination module 208, a user profile loading module 210, and a guest profile loading module 212. Each of the BLE communication module 200, the SPP communication module 202, the mobile device detection module 204, the user profile lookup module 206, the user profile determination module 208, the user profile loading module 210, and the guest profile loading module 212 may be a program module in the form of operating systems, application program modules, and other program modules stored in the one or more memory modules 134. Such a program module may include, but is not limited to, routines, subroutines, programs, objects, components, data structures and the like for performing specific tasks or executing specific data types as will be described below.

The BLE communication module 200 may establish BLE communication with one or more mobile devices using the BLE protocol. Specifically, the BLE communication module 200 may cause the network interface hardware 130 to broadcast a BLE signal that may be detected by mobile devices located inside or near the primary vehicle. When a mobile device receives the BLE broadcast signal, a communication channel may be established between the BLE communication module 200 and the mobile device by pairing the mobile device to the BLE communication module 200 using the BLE protocol.

In embodiments, a mobile device may run an appropriate application (e.g., an application compatible with the primary vehicle system 102) so that the mobile device may be paired with the BLE communication module 200. By using the BLE protocol, the BLE communication module 200 may pair with a mobile device even if the mobile device has not previously been paired with the primary vehicle system 102. Once a mobile device is paired to the BLE communication module 200, data may be transmitted between the BLE communication module 200 and the mobile device via the network interface hardware 130.

The SPP communication module 202 may establish SPP communication with a mobile device using the SPP protocol. However, unlike the BLE protocol, the SPP protocol can only be used to pair with a mobile device that has been previously paired to the primary vehicle system 102. Accordingly, the SPP communication module 202 may cause the network interface hardware 130 to ping for mobile devices that have previously been paired to the SPP communication module 202. When a mobile device responds to a ping from the SPP communication module 202, a communication channel may be established between the SPP communication module 202 and the mobile device by pairing the mobile device to the SPP communication module 202 using the SPP protocol. Once a mobile device is paired to the SPP communication module 202, data may be transmitted between the SPP communication module 202 and the mobile device via the network interface hardware 130.

The mobile device detection module 204 may detect one or more mobile devices positioned within or in the vicinity of the primary vehicle. Specifically, after a mobile device is paired to either the BLE communication module 200 or the SPP communication module 202, the mobile device detection module 204 may determine a device ID associated with the paired mobile device. In embodiments, each mobile device that is able to pair with the BLE communication module 200 and/or the SPP communication module 202 (e.g., each mobile device running an application associated with the primary vehicle system 102) has a device ID that uniquely identifies the mobile device. Accordingly, the device ID of a paired mobile device may be detected by the mobile device detection module 204 to identify the paired mobile device. Furthermore, each device ID may be associated with a particular user profile associated with an owner or user of the mobile device having the device ID. As such, a device ID of a mobile device may be used to determine a user profile associated with a particular user.

In embodiments, one or more user profiles associated with one or more device IDs may be stored in the data storage component 128. As discussed above, each user profile may include a list of objects that are deemed to be relevant to that particular occupant such as specific landscapes, businesses, animals, and the like, and associated identifying data for each of the objects. More particularly, a user profile may include a list of objects identified as being relevant such as, for example, rainbows, mountains, horses, and the like. The settings of the user profile may be stored in the data storage component 128. In some examples, a user may select a user profile by operating the tactile operating device 118. In some examples, a user may establish a user profile using a mobile device. In other examples, a user may establish a user profile using other methods and/or devices. In some embodiments, one or more user profiles may be stored in the server 106, and the primary vehicle system 102 may receive the one or more user profiles from the server 106 when corresponding user profiles are needed to be loaded on the primary vehicle system 102.

Referring still to FIG. 2, the user profile lookup module 206 may look up a user profile associated with a particular device ID associated with a mobile device. That is, after a mobile device is paired to either the BLE communication module 200 or the SPP communication module 202 and the mobile device detection module 204 determines the device ID of the paired mobile device, the user profile lookup module 206 may access the data storage component 128 and determine whether a user profile exists that is associated with the determined device ID. If a user profile has been established for the user associated with a detected device ID, then that user profile will be stored in the data storage component 128 and the user profile lookup module 206 may access that user profile. Alternatively, if no user profile exists for the detected device ID, then no user profile associated with the detected device ID will be stored in the data storage component 128 and the user profile determination module 208 will be unable to access a user profile associated with the detected device ID. If multiple mobile devices are detected by the mobile device detection module 204, the user profile lookup module 206 may determine whether a user profile associated with each such mobile device exists and may access each existing user profile.

Referring still to FIG. 2, the user profile determination module 208 determines which user profile to load. In embodiments in which a user profile is selected by operating the tactile operating device 118, the user profile is loaded. In addition, if a single mobile device is detected by the mobile device detection module 204, and the user profile lookup module 206 is able to access a user profile associated with the device ID of the detected mobile device, then the user profile determination module 208 may determine that the user profile associated with the detected mobile device should also be loaded.

Alternatively, if no user profile is selected using the tactile operating device 118 and a single mobile device is detected by the mobile device detection module 204, but the user profile lookup module 206 is unable to find a user profile associated with the device ID of the detected mobile device, then the user profile determination module 208 may determine that a guest profile should be loaded. A guest profile may include a default list of objects determined to be relevant for which an occupant of the vehicle should be made aware. A guest profile may be stored in the data storage component 128. Accordingly, the user profile determination module 208 may determine that a guest user profile is to be loaded.

In examples where the mobile device detection module 204 detects multiple mobile devices and/or a user profile is also selected using the tactile operating device 118, multiple user profiles may be loaded. As such, the user profile determination module 208 may determine which user profile to load using the techniques described herein.

Referring still to FIG. 2, the user profile loading module 210 may load the user profile(s) selected by the user profile determination module 208 stored in the data storage component 128. This may provide a master list identifying all relevant objects of which an occupant of the primary vehicle should be made aware.

The guest profile loading module 212 may load the guest profile stored in the data storage component 128 when the user profile determination module 208 determines that the guest profile should be loaded. This may cause the primary vehicle system 102 to identify only those relevant objects associated with the guest user profile. In some examples, a user may adjust the list of relevant objects associated with the guest profile.

Figure 3:
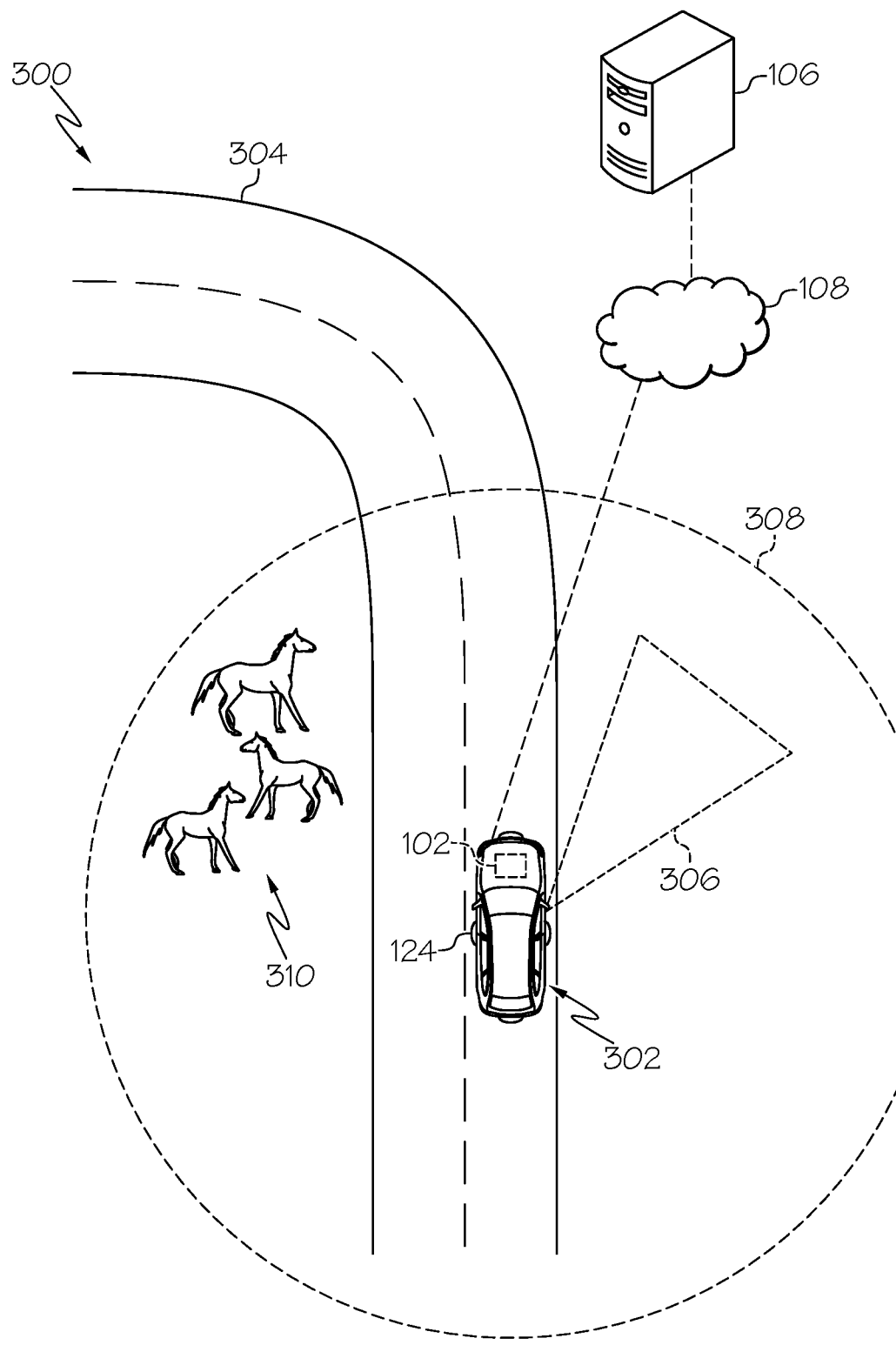
FIG. 3 schematically depicts an illustrative embodiment of an object notification system including a primary vehicle, according to one or more embodiments shown and described herein.

Referring now to FIG. 3, an embodiment of an object notification system 300 is illustrated in which only a primary vehicle 302 is utilized. As such, the object notification system 300 includes the primary vehicle system 102, embodied within the primary vehicle 302, and the server 106, which communicates with the primary vehicle system 102 of the primary vehicle 302 via the network 108. The primary vehicle 302 may be a vehicle including an automobile or any other passenger or non-passenger vehicle such as, for example, a terrestrial, aquatic, and/or airborne vehicle. In some embodiment, the primary vehicle 302 may be an unmanned aerial vehicle (UAV), commonly known as a drone. The server 106 may be a remote server such as a cloud server. In some embodiments, the server 106 may be a local server including, but not limited to, a roadside unit, an edge server, and the like. The server 106 may communicate with vehicles in an area covered by the server 106. The server 106 may communicate with other servers that cover different areas. The server 106 may communicate with a remote server and transmit information collected by the server 106 to the remote server.

As shown, the primary vehicle 302 is driving along a roadway 304 and a gaze 306 of an occupant of the primary vehicle 302 is illustrated as being directed in a direction away from the roadway 304. It should be appreciated that the gaze 306 of the occupant, specifically the direction of the gaze 306, may be detected by the one or more interior sensors 126 (FIG. 1) of the primary vehicle system 102 mounted within an occupant area of the primary vehicle 302.

In addition, a notification zone 308 is illustrated as surrounding the primary vehicle 302. The notification zone 308 is defined by an outer perimeter with the primary vehicle 302 in a center of the notification zone 308. As described in more detail herein, the primary vehicle 302 may receive notifications for only those objects detected by the one or more exterior sensors 124, determined to be relevant, and appear or are predicted to appear within the notification zone 308. It should be appreciated that the size of the notification zone 308 is only illustrated for illustrative purposes and not meant to be limiting. Accordingly, the notification zone 308 may be larger or smaller, or have a geometry other than that illustrated. For example, the notification zone 308 may be circular, as illustrated. Alternatively, the notification zone 308 may extend further in one direction than another direction. In embodiments, a specific notification zone may be assigned to a corresponding object to be detected. For example, a notification zone associated with a mountain or other landscape may be much larger than a notification zone associated with a pedestrian or animal, which is more likely to be located closer to the roadway 304.

Referring still to FIG. 3, an object 310, illustrated herein as a herd of horses, is shown located off to a side of the roadway 304. As the primary vehicle 302 drives along the roadway 304, object data of the object 310 may be detected by the one or more exterior sensors 124 provided on the primary vehicle 302. Once the object 310 is identified and determined to be a relevant object, as discussed in more detail herein, the primary vehicle system 102 may determine that the object 310 will enter the notification zone 308 associated with the object 310, e.g., a herd of horses, and continue capturing object data of the object 310. Once the object 310 enters the notification zone 308, the interior sensors 126 of the primary vehicle system 102 are utilized to identify the gaze 306 of an occupant of the primary vehicle 302 for whom the object 310 was determined to be relevant, and it is determined whether the gaze 306 of the occupant is in the direction of the object 310 within the notification zone 308. As shown in FIG. 3, the object 310 has entered the notification zone 308 and the gaze 306 is not directed toward the object 310. Thus, it is likely that the occupant will not notice the object 310 and, as a result, the occupant of the primary vehicle 302 will be notified of the presence of the object 310 in relation to the primary vehicle 302.

Figure 4:
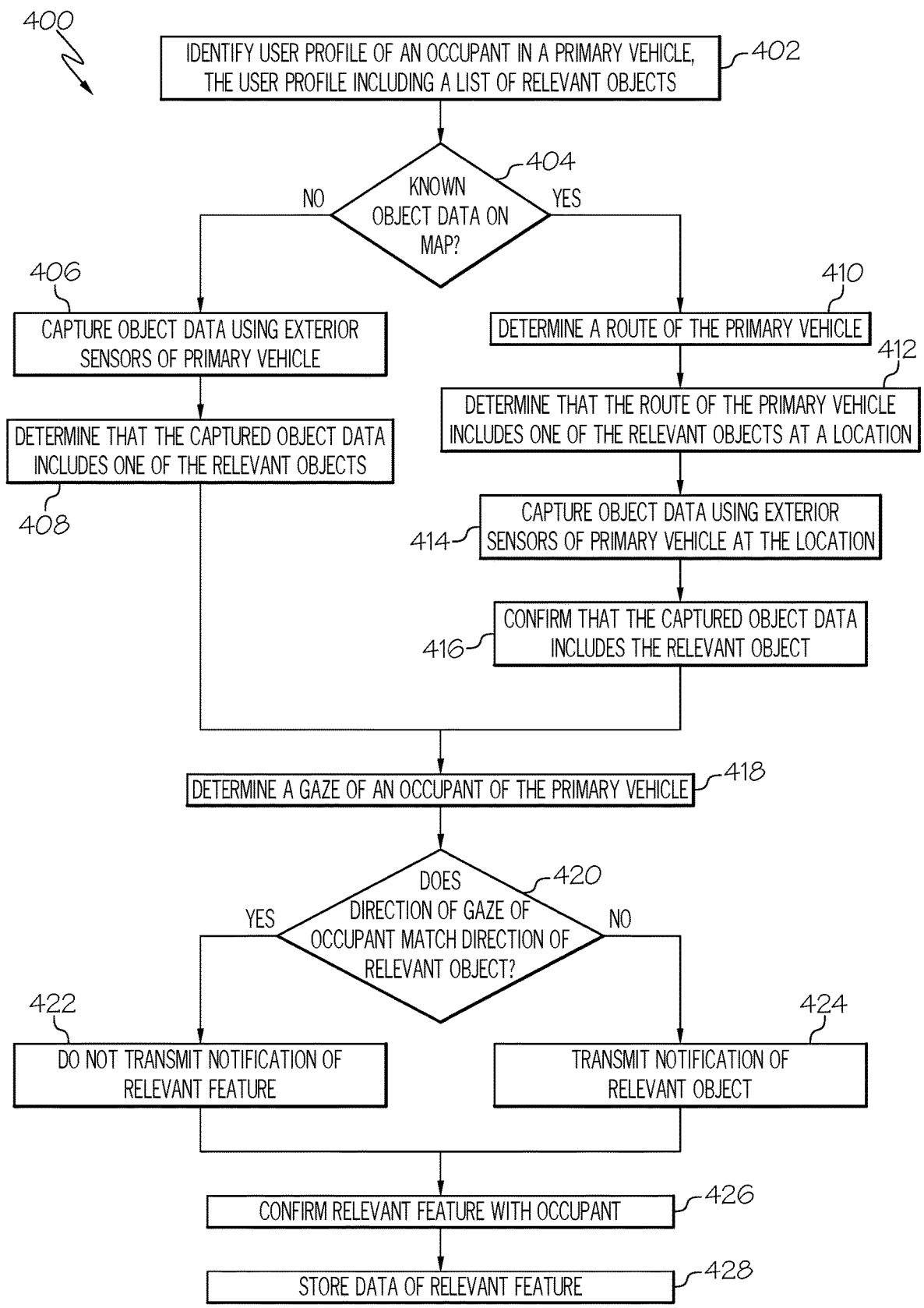
FIG. 4 schematically depicts a flowchart of an illustrative method for identifying a relevant object and notifying a primary vehicle of the presence of the relevant object, according to one or more embodiments shown and described herein.

Referring now to FIG. 4, a method 400 is depicted for capturing images of an object identified as being relevant to an occupant of a vehicle and notifying the occupant of the presence of the object. The method 400 is discussed with reference to the object notification system 300 illustrated in FIG. 3 including only the primary vehicle 302, and the individual components of the primary vehicle system 102 illustrated in FIGS. 1 and 2.

Initially, at step 402, a user profile of an occupant of the primary vehicle 302 is identified. As discussed herein, the user profile may be identified upon an occupant of the primary vehicle 302 operating the tactile operating device 118. Alternatively, the user profile may be identified by detecting the presence of a mobile device and associating the mobile device with a user profile by utilizing the mobile device detection module 204, the user profile lookup module 206, the user profile determination module 208, and the user profile loading module 210. The user profile includes a list of objects determined to be "relevant" to the particular occupant. As used herein, the term "relevant" is used to identify that the occupant would desire to be notified of the presence of the particular object when the object is within range of the occupant, i.e., the primary vehicle 302. Further, each object may have a corresponding range that differs between various objects. The information associated with the user profile may be updated by operating the tactile operating device 118, a mobile device, or any other suitable manner discussed herein, such as by requesting feedback after the occupant has been notified of the presence of the object. It should be appreciated that in embodiments in which more than one occupant is within the primary vehicle 302, a plurality of user profiles may be simultaneously loaded. By loading multiple user profiles, the total number of potential relevant objects that may be identified may increase as opposed to when only a single user profile is loaded.

As described herein, the one or more exterior sensors 124 are utilized to identify objects, and more particularly, relevant objects approaching the primary vehicle 302. In embodiments, object data may be provided on a map from other vehicles communicating with the primary vehicle 302, either directly or indirectly via the server 106 or the network 108. When object data is provided, the exterior sensors 124 may be utilized on a periodic or intermittent basis when relevant objects are known to be approaching the primary vehicle 302 to confirm that the presence of the object was correctly identified. Alternatively, if no previously known object data is provided, the exterior sensors 124 are operated on a more continual basis to identify such objects. Thus, at step 404, it is determined whether there is known object data provided on a map. If it is determined that no known object data is provided on a map, then the method 400 proceeds to step 406 at which the exterior sensors 124 are activated to identify an object, such as the object 310, and capture object data of the object 310. As object data is captured at step 406, the object data is analyzed at step 408 to determine whether the captured object data includes one or more relevant objects identified in the user profile associated with the occupant of the primary vehicle 302.

Alternatively, if it is determined at step 404 that known object data is provided on a map, the method 400 proceeds to step 410 in which a route of the primary vehicle 302 is determined. In embodiments, the route of the primary vehicle 302 may be determined based on a known or predetermined destination of the primary vehicle 302, which may be selected, for example, by operating the tactile operating device 118. Once the route of the primary vehicle 302 is known, it is determined at step 412 whether a relevant object is located along the route of the primary vehicle 302. The determination at step 412 is made by scanning the route for potential relevant objects from the list of relevant objects of the user profile associated with the occupant of the primary vehicle 302. As noted above, this allows the exterior sensors 124 to be operated as the primary vehicle 302 approaches those locations at which a relevant object was determined to be present based on the known object data rather than continuously operating the exterior sensors 124 when no previous object data is known. Thus, the exterior sensors 124 may utilize less power.

At step 414, as the primary vehicle 302 is approaching a location at which a relevant object, e.g., the object 310, was determined to be present, the exterior sensors 124 are activated and additional object data is captured, particularly object data of the predicted relevant object 310.

At step 416, the object data captured by the exterior sensors 124 is analyzed to confirm that the relevant object 310 is present and correctly identified.

After the relevant object 310 is identified, either at step 408 or at step 416, and determined to be within the notification zone 308 of primary vehicle 302, the interior sensors 126 of the primary vehicle 302 are utilized at step 418 to detect the gaze 306 of the associated occupant for whom the object 310 was deemed relevant. After detecting the gaze 306 of the occupant, it is determined at step 420 whether the gaze 306 of the occupant is directed in a direction matching a direction of the relevant object 310 in relation to the primary vehicle 302. As referred to herein, when the direction of the occupant's gaze 306 is determined to "match" a direction of the relevant object 310, it is determined that the occupant is likely to be looking at, or at least in the direction of, the relevant object 310. Further, it may be determined that the occupant's gaze 306 matches the direction of the object 310 if an angle of the occupant's gaze 306 is within a threshold angle of the direction of the relevant object 310 such as, for example, 10 degrees, 20 degrees, 30 degrees, or the like. Similarly, it may be determined that the occupant's gaze 306 matches the direction of the relevant object 310 if movement of the occupant's gaze 306 appears to correspond with movement of the relevant object 310 as the primary vehicle 302 passes the relevant object 310.

If it is determined at step 420 that the direction of the occupant's gaze 306 matches the direction of the relevant object 310, the method 400 proceeds to step 422 such that no notification is provided to the primary vehicle 302. Alternatively, if it is determined at step 420 that the direction of the occupant's gaze 306 does not match the direction of the relevant object 310, such as shown in FIG. 3, the method 400 proceeds to step 424 in which a notification is provided to alert the occupant of the presence of the relevant object 310. It should be appreciated that the notification may be any suitable notification such as, for example, an audible alert emitted from the speaker 116, a visual notification provided on the display device 114, or a display projected onto a HUD of the primary vehicle 302 in the form of a holographic display. The notification may provide details as to the identity of the relevant object 310 and/or the location of the relevant object 310 in relation to the primary vehicle 302. In some embodiments, a notification is provided to alert the occupant of the presence of the relevant object 310 without determining a gaze of an occupant of the primary vehicle at step 418. That is, regardless of the gaze of the occupant, the primary vehicle 302 may alert the occupant of the presence of the relevant object 310.

After providing notification of the presence of the relevant object 310, a request may be provided at step 426 to request input from the occupant as to whether the relevant object 310 was in fact relevant to the occupant. For example, the virtual assistance module 122 may provide an audible request through the speaker 116 asking the occupant whether the relevant object was relevant such as, for example, "Was the object identified relevant to you?" or "Would you like to be notified of this object in the future?" In response, the virtual assistance module 122 may identify a response from the occupant including a confirmation or denial that the object 310 was correctly identified, not relevant, and/or that the occupant does not wish to be notified of the object 310 in the future. A suitable confirmation from the occupant may be, for example, "Yes, the object was relevant" or "Yes, please continue to notify me of similar objects in the future." This feedback is utilized to update the associated user profile. For example, if the virtual assistance module 122 determines that the occupant would not like to be notified of similar objects in the future, the user profile for that occupant will be updated to remove the object from the list of relevant objects, thereby disregarding future detections of the relevant object 310.

At step 428, the virtual assistance module 122 may recognize a request from the occupant to store the captured object data of the relevant object 310. Such a request may include a verbal command from the occupant such as, for example, "Please store a picture of the object." Upon receiving the request from the occupant, the object data of the object 310 captured by the exterior sensors 124, which may include image data and/or audio data, is stored. The object data may be stored in the data storage component 128 of the primary vehicle system, transmitted for storage at the server 106, and/or transmitted to a mobile device of the occupant.

Figure 5:
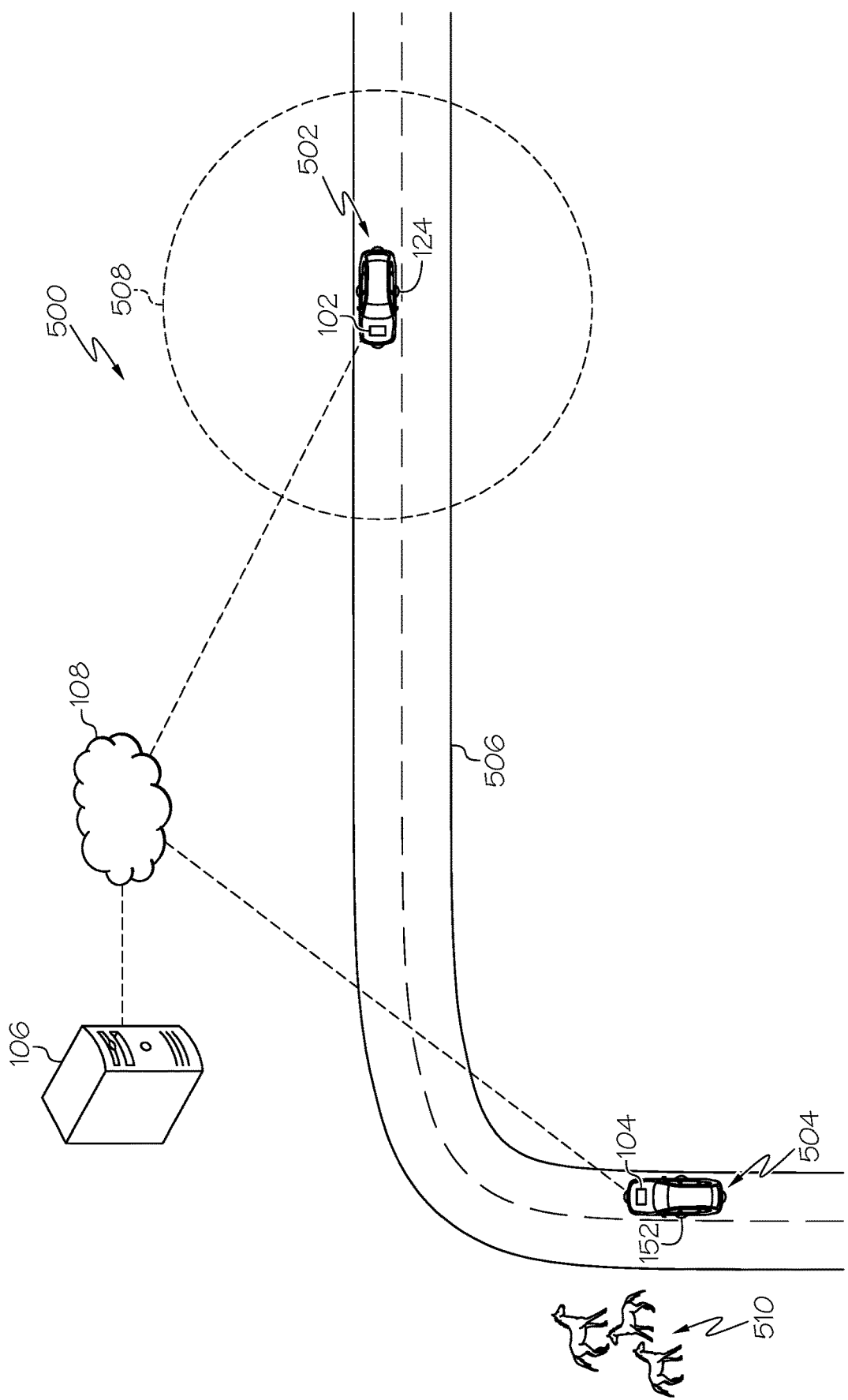
FIG. 5 schematically depicts an illustrative embodiment of an object notification system including a primary vehicle and a secondary vehicle, according to one or more embodiments shown and described herein.

Referring now to FIG. 5, an embodiment of an object notification system 500 is illustrated in which both a first or primary vehicle 502 and a second or secondary vehicle 504 are present. As such, the object notification system 500 includes the primary vehicle system 102, embodied within the primary vehicle 502, the secondary vehicle system 104, embodied within the secondary vehicle 504, and the server 106, which communicates with the primary vehicle system 102 of the primary vehicle 502, and the secondary vehicle system 104 of the secondary vehicle 504 via the network 108. Although only one secondary vehicle 504 is illustrated, is should be appreciated that any number of secondary vehicles 504 may be utilized.

As shown, the primary vehicle 502 and the secondary vehicle 504 are driving in opposite directions along a roadway 506. In addition, a notification zone 508 is illustrated as surrounding the primary vehicle 502. As described herein, the primary vehicle 502 should receive notifications for only those objects determined to be relevant and appear or are predicted to appear within the notification zone 508. In this embodiment, a user profile is identified for an occupant of the primary vehicle 502. As discussed herein, the user profile includes a list of relevant objects. The primary vehicle 502 transmits the user profile, particularly the list of relevant objects, to the server 106. In embodiments, the server 106 may receive a plurality of list of relevant objects transmitted from a plurality of vehicles. As described in more detail herein, the server 106 may transmit the list of relevant objects to those secondary vehicles 504 traveling along the same roadway 506, and particularly the same route as the primary vehicle 502, so that the secondary vehicles 504 may capture object data of an object determined to be a relevant object to the approaching primary vehicle 502.

Referring still to in FIG. 5, an object 510, illustrated herein as a herd of horses, is shown off to a side of the roadway 506 proximate the secondary vehicle 504. As the secondary vehicle 504 drives along the roadway 506, object data of the object 510 may be detected by the one or more exterior sensors 152 provided on the secondary vehicle 504. Once the object 510 is identified and determined to be relevant to an occupant of the primary vehicle 502, the secondary vehicle system 104 may determine that the object 510 will enter the notification zone 508 of the primary vehicle 502. The object data may then be transmitted to the primary vehicle 502 via the server 106 to notify the primary vehicle 502 that the primary vehicle 502 will be approaching the relevant object 510. Accordingly, the primary vehicle 502 may be notified of the presence of the relevant object 510 in advance of approaching the object 510.

Figure 6:
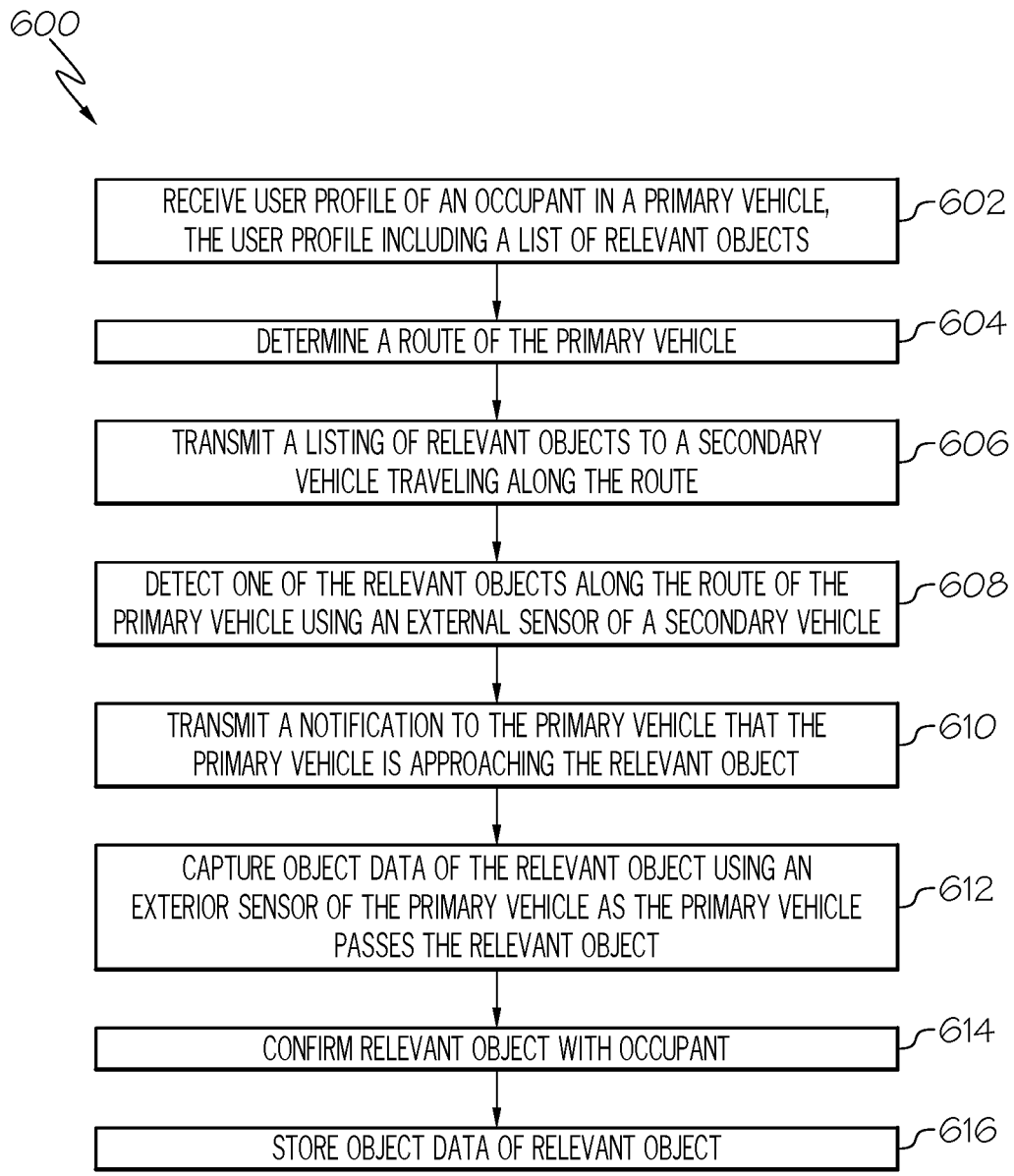
FIG. 6 schematically depicts a flowchart of an illustrative method for identifying a relevant object by a secondary vehicle and notifying a primary vehicle of the presence of the relevant object, according to one or more embodiments shown and described herein.

Referring now to FIG. 6, a method 600 is depicted for notifying an occupant of a vehicle of the presence of a relevant object in advance of the vehicle approaching the relevant object. The method 600 is discussed with reference to the object notification system 500 illustrated in FIG. 5 including the primary vehicle 502 and the secondary vehicle 504, and the individual components of the primary vehicle system 102 and the secondary vehicle system 104 illustrated in FIGS. 1 and 2.

At step 602, the server 106 receives a user profile associated with an occupant of the primary vehicle 502. As discussed herein, the user profile may be identified upon an occupant of the primary vehicle 502 operating the tactile operating device 118. Alternatively, the user profile may be identified by detecting the presence of a mobile device and associating the mobile device with a user profile by utilizing the mobile device detection module 204, the user profile lookup module 206, the user profile determination module 208, and the user profile loading module 210. As discussed herein, the list of relevant objects identified in the user profile is transmitted to the server 106.

At step 604, a route in which the primary vehicle 502 is traveling is determined. In embodiments, the route of the primary vehicle 502 may be determined based on a known or predetermined destination of the primary vehicle 502, which may be selected, for example, by operating the tactile operating device 118. The determined route of the primary vehicle 502 may be transmitted to the server 106 to identify which secondary vehicles should monitor for objects relevant to the primary vehicle 502, as discussed herein. Once the secondary vehicles, such as the secondary vehicle 504, is identified as traveling along the same route as the primary vehicle 502, the server 106 transmits the listing of relevant objects to the secondary vehicle 504 as step 606.

At step 608, a relevant object, e.g., the object 510, along the route of the primary vehicle 502 is detected by the exterior sensors 152 of the secondary vehicle 504. More particularly, the server 106 transmits data regarding the list of relevant objects to the secondary vehicle 504, or a plurality of secondary vehicles 504, located along the same route as the primary vehicle 502 and/or within a predetermined range of the primary vehicle 502. In response to receiving the list of relevant objects, the exterior sensors 152 of the secondary vehicles 504 are operated to monitor for relevant objects from the list of relevant objects and capture object data of any relevant objects appearing on the list of relevant objects. If the secondary vehicle 504 identifies a relevant object, the captured object data is transmitted to the server 106. As such, it should be appreciated that the secondary vehicle 504 is only instructed to capture object data of relevant objects for the primary vehicle 502 that is within range or traveling along the same route as the secondary vehicle 504. This prevents the secondary vehicle 504 from capturing object data of relevant objects for the primary vehicle 502 that is not likely to encounter the relevant object.

In response to the server 106 receiving the object data from the secondary vehicle 504, a notification is executed at step 610 to the primary vehicle 502 indicating that the primary vehicle 502 is approaching the relevant object 510. In embodiments, prior to transmitting the notification to the primary vehicle 502, the server 106 may analyze the object data to confirm that the object data in fact includes an object that is relevant to the primary vehicle 502. In addition, the server 106 may process the object data to confirm that the relevant object will appear within the notification zone 508 of the primary vehicle 502.

It should be appreciated that the notification may be any suitable notification such as, for example, an audible alert emitted from the speaker 116, a visual notification provided on the display device 114, or a display projected onto a HUD of the primary vehicle 502 in the form of a holographic display. The notification may provide details as to the identity of the relevant object 510, the location of the relevant object 510 in relation to the primary vehicle 502, and/or a time at which the primary vehicle 502 will be passing the relevant object 510. In embodiments, a second or subsequent notification, similar to the first or initial notification, may be executed as the primary vehicle 502 approaches the relevant object 510 and the relevant object 510 enters the notification zone 508. This provides additional notification to the occupant of the primary vehicle 502 as to when the relevant object is visible to the occupant, rather than the advance notification provided initially. As with the initial notification, the second notification may be any suitable notification such as, for example, an audible alert emitted from the speaker 116, a visual notification provided on the display device 114, or a display projected onto a HUD of the primary vehicle 502 in the form of a holographic display. More particularly, the second notification may indicate the direction of the relevant object 510 in relation to the primary vehicle 502 so that the occupant knows where to look. In embodiments, the second notification may not be necessary if a gaze of the occupant is detected by the interior sensor 126 of the primary vehicle 502 and determined to match a direction of the relevant object 510, as discussed herein.

To confirm that the object 510 was correctly identified and/or in fact relevant to the primary vehicle 502, object data of the relevant object 510 may be captured at step 612 as the primary vehicle 502 passes the relevant object 510. Thus, as the primary vehicle 502 approaches the location at which a relevant object 510 was determined to be present, the exterior sensors 124 of the primary vehicle 502 are activated and additional object data is captured by the primary vehicle 502, particularly object data of the predicted relevant object 510.

At step 614, it is confirmed whether the relevant object 510 was correctly identified and/or relevant to the occupant of the primary vehicle 502. Specifically, a request may be provided to request input from the occupant as to whether the relevant object 510 was in fact relevant to the occupant. For example, the virtual assistance module 122 may provide an audible request through the speaker 116 asking the occupant whether the relevant object 510 was relevant such as, for example, "Was the object identified relevant to you?" or "Would you like to be notified of this object in the future?" In response, the virtual assistance module 122 may identify a response from the occupant including a confirming or denial such that the object 510 was not relevant or that the occupant does not wish to be notified of the object 510 in the future. A suitable confirmation from the occupant may be, for example, "Yes, the object was relevant" or "Yes, please continue to notify me of similar objects in the future." This feedback is utilized to update the associated user profile. For example, if the virtual assistance module 122 determines that the occupant would not like to be notified of similar objects in the future, the user profile for that occupant will be updated to remove the object 510 from the list of relevant objects, thereby disregarding future detections of the relevant object 510. In other embodiments, the user profile may be updated by the occupant operating the tactile operating device 118 or in any other suitable manner.

At step 616, in embodiments, a request may be received to store the captured object data of the relevant object 510. Specifically, the virtual assistance module 122 may recognize a request from the occupant to store the captured object data of the relevant object 510. Such a request may include a verbal command from the occupant such as, for example, "Please store a picture of the object." Upon receiving the request from the occupant, the object data of the object 510 captured by the primary vehicle 502 and/or the secondary vehicle 504, which may include image data and/or audio data, is stored. The object data may be stored in the data storage component 128 of the primary vehicle system 102, transmitted for storage at the server 106, and/or transmitted to a mobile device of the occupant.

From the above, it is to be appreciated that defined herein are object notification systems and methods for identifying an object that is relevant to a particular occupant of a vehicle and notifying the occupant of the presence of the relevant object. The relevant object may be identified by primary vehicle, in which a notification of the relevant object is provided in real-time, or by a secondary vehicle such that a notification may be provided in advance of the primary vehicle approaching the relevant object.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
    selecting a user profile of an occupant in a vehicle, the user profile including a list of relevant objects;
    capturing object data using a data capture device of the vehicle;
    determining that the captured object data includes a relevant object from the list of relevant objects of the selected user profile; and
    executing a notification at the vehicle indicating a presence of the relevant object in response to determining that the captured object data includes the relevant object.

2. The method of claim 1, further comprising:
    determining a gaze of the occupant of the vehicle; and
    executing the notification in response to determining that the gaze of the occupant does not match a direction of the relevant object.

3. The method of claim 1, wherein the notification is a visual notification on a display device of the vehicle indicating a direction of the relevant object.

4. The method of claim 1, wherein the notification is an audible notification indicating a direction of the relevant object.

5. The method of claim 1, further comprising:
    determining a route of the vehicle;
    determining that the route includes the relevant object at a location; and
    capturing the object data at the location.

6. The method of claim 1, further comprising receiving a confirmation that the relevant object was correctly identified.

7. The method of claim 1, further comprising receiving an instruction to update the user profile to disregard future detections of the relevant object.

8. The method of claim 1, further comprising receiving an instruction to capture an image of the relevant object and store the image on a user device.

9. A method comprising:
selecting a user profile of an occupant in a first vehicle, the user profile including a list of relevant objects;
determining a route of the first vehicle;
detecting a relevant object from the list of relevant objects along the route of the first vehicle using a data capture device of a second vehicle; and
executing a notification at the first vehicle indicating that the first vehicle is approaching the relevant object.

10. The method of claim 9, wherein the notification is a visual notification on a display device of the first vehicle.

11. The method of claim 9, wherein the notification is an audible notification indicating a time at which the first vehicle will pass the relevant object.

12. The method of claim 9, further comprising executing a second notification at the first vehicle when the first vehicle passes the relevant object.

13. The method of claim 12, wherein the second notification is a visual notification indicating a direction of the relevant object.

14. The method of claim 9, further comprising receiving a confirmation that the relevant object was correctly identified.

15. The method of claim 9, further comprising receiving an instruction to update the user profile to disregard future detections of the relevant object.

16. The method of claim 9, further comprising receiving an instruction to capture an image of the relevant object and store the image on a user device.

17. An object notification system comprising:
a controller configured to:
select a user profile of an occupant in a vehicle, the user profile including a list of relevant objects;
capture object data using a data capture device of the vehicle;
determine whether the captured object data includes a relevant object from the list of relevant objects of the selected user profile; and
execute a notification at the vehicle indicating a presence of the relevant object in response to determining that the captured object data includes the relevant object.

18. The object notification system of claim 17, wherein the controller is further configured to:
determine a gaze of the occupant of the vehicle; and
execute the notification in response to determining that the gaze of the occupant does not match a direction of the relevant object.

19. The object notification system of claim 17, wherein the notification is a visual notification indicating a direction of the relevant object the visual notification being displayed on a display device of the vehicle.

20. The object notification system of claim 17, wherein the notification is an audible notification indicating a direction of the relevant object.

* * * * *

UNITED STATES PATENT AND TRADEMARK OFFICE
CERTIFICATE OF CORRECTION

PATENT NO. : 11,312,300 B1
APPLICATION NO. : 17/161744
DATED : April 26, 2022
INVENTOR(S) : Akila C. Ganlath, Nejib Ammar and Prashant Tiwari It is certified that error appears in the above-identified patent and that said Letters Patent is hereby corrected as shown below:

In the Specification

In Column 15, Line(s) 32, before "should", delete "is" and insert --it--, therefor.

Signed and Sealed this
Fifth Day of July, 2022

Katherine Kelly Vidal
Director of the United States Patent and Trademark Office